United States Patent [19]

Nogura et al.

[11] Patent Number: 5,306,777
[45] Date of Patent: Apr. 26, 1994

[54] ACRYLIC POLYMERS

[75] Inventors: Kouichi Nogura, Kurokawa; Kouichi Fujie, Kajikawa; Chouji Suga, Shibata; Naokiyo Inomata, Nakajyo; Mitsuo Ootani, Niigata, all of Japan

[73] Assignee: Kuraray Co., Ltd., Kurashiki, Japan

[21] Appl. No.: 731,326

[22] Filed: Jul. 17, 1991

[30] Foreign Application Priority Data

Jul. 18, 1990 [JP] Japan .................................. 2-191718
May 30, 1991 [JP] Japan .................................. 3-155604

[51] Int. Cl.$^5$ .................... C08F 265/04; C08F 265/06
[52] U.S. Cl. ...................................... 525/309; 525/85; 525/305; 528/481; 528/502; 528/503
[58] Field of Search ................................ 525/305, 309

[56] References Cited

U.S. PATENT DOCUMENTS 4,513,118 4/1985 Suetterlin et al. .................. 525/304
4,906,699 3/1990 Siol et al. ............................ 525/76

OTHER PUBLICATIONS

Olabisi et al. "Polymer-Polymer Miscibility", Academic Press, 1979, p. 279.

Primary Examiner—Vasu S. Jagannathan
Attorney, Agent, or Firm—Oblon, Spivak, McClelland, Maier & Neustadt

[57] ABSTRACT

An acrylic molded product comprising an acrylic polymer coagulated material having excellent characteristics in impact resistance, optical properties, and hydrothermal resistance; an acrylic polymer coagulated material used for the preparation thereof; an composition comprising thereof; and a process for manufacture thereof; characterized by using an emulsion polymerization and a polymer with multiphase structured material comprising a hard phase and a soft phase and being freeze-coagulated.

1 Claim, No Drawings

ACRYLIC POLYMERS

BACKGROUND OF THE INVENTION

1. Field of the Invention

This invention relates to a molded product with excellent impact resistance comprising an acrylic polymer coagulated material with multiphase structure, an acrylic polymer coagulated material used for the manufacture thereof, a composition thereof, and a manufacturing process for preparing said acrylic polymer coagulated materials and said compositions thereof.

2. Description of Prior Art

Discontinuous dispersion of elastic rubbery phase in hard resin has been generally used to improve impact resistant properties of acrylic resin, styrene resin, vinyl chloride resin, etc. Introducing of diene type rubber has been generally applied, and introducing acrylic rubbers has also been used because of their outstanding weatherabilities.

As for modifier resins using acrylic rubbers, various polymers with multiphase structure wherein combination of soft phase and hard phase based on core/shell structure have been studied (Japanese Patent No. Sho 54-18298, Sho 55-27576, Sho 62-41241). Emulsion polymerization methods have been widely applied for producing said modifier resins, which need an isolating process for separating the polymer from the polymer latex. For this purpose, adding an inorganic salt, such as aluminum chloride, magnesium sulfate, etc., adding an acid, such as sulfuric acid, etc., or spray drying etc. have been used. However, these methods have drawbacks such as fall in productivity and moldability, etc. because of the difficulties in handling characteristics caused by very fine powder state. Also molded products using these polymers have drawbacks such as degrading in optica properties by thermal coloration, in hydrothermal resistance shown as whitening when dipped in hot water, etc.

In order to improve the handling characteristics of a polymer, Japanese Patent Laid-open No. Sho 58-1742 shows that mixing a slurry of an impact modifier polymer and a slurry of hard inelastic polymer and then drying to control blocking at drying. However, the improvement in blocking by this method is not satisfactory and further no improvement was found in thermal coloration and in hydrothermal resistance when dipped in hot water.

In order to improve thermal coloration, Japanese Patent Laid-open No. Sho 61-108629 discloses a process comprising polymerizing with an emulsifier having a group selected from the group of consisting of $-SO_3M$, $-COOM$, and $-SO_3M$ wherein M is sodium or potassium and isolating the formed polymer by the addition of an aqueous magnesium sulfate solution to the latex, and Japanese Patent Laid-open No. Sho 63-227606 discloses a process comprising polymerizing with an emulsifier having a group selected from the group consisting of $-PO_3M_2$, and $-PO_2M$ wherein M represents an alkali or an alkali earth element and isolating the formed polymer by the addition of an aqueous magnesium sulfate solution. Although some improvements have been recognized, but the level of improvement is not satisfactory. Also, the isolated polymers show inferior handling characteristics caused by very fine powder state, and no improvent was found in hydrothermal resistance.

Accordingly, it is an object of the present invention to provide a molded product comprising an acrylic polymer coagulated material having excellent characteristics in impact resistance, optical properties and hydrothermal reistance; an acrylic polymer coagulated material used for the manufacture thereof; a composition thereof; and a manufacturing process for prepareing them.

SUMMARY OF THE INVENTION

Present inventors have made intensive studies on these problems, and it was found that an acrylic polymer coagulated material with multiphase structure obtained by emulsion polymerization and freeze-coagulation can dissolve the above mentioned problems, and the invention was completed.

That is, the present invention relates to an acrylic polymer coagulated material comprizing a polymer with multiphase structure formed by emulsion polymerization which comprises (1) the outer-most phase being a hard phase comprising 40 to 100% by weight of at least one methacrylate unit and 0 to 60% by weight of another monomer unit copolymerizable therewith, and the polymer of the hard phase, if formed in the absence of other phases, having a glass transition temperature (hereinafter referred to as Tg) of 25° C. or more; and (2) at least one inner phase being a soft phase comprising 40 to 99.9% by weight of at least one acrylate, 0 to 60% by weight of another monomer unit copolymerizable therewith, and 0.1% to 5% by weight of a polyfunctional monomer unit, and the polymer of the soft phase, if formed in the absence of other phases, having a Tg of less than 25° C., and the polymer with multiphase structure being freeze-coagulated: a composition thereof: a manufacturing process for preparing them: and a molded product comprising thereof.

DETAILED DESSCRIPTION OF THE INVENTION

The polymer with multiphase structure constituting the acrylic polymer coagulated material (hereinafter sometimes referred to as coagulated material) of the present invention, being obtained by emulsion polymerizing, which comprises (1) the outer-most phase being a hard phase comprising 40 to 100% by weight of at least one acrylate unit, 0 to 60% by weight of another monomer unit copolymerizable therewith, and the polymer of the hard phase, if formed in the absence of other phases, having a Tg of 25° C. or more; and (2) at least one inner phase being a soft phase comprising 40 to 99.9% by weight of at least one acrylate unit, 0 to 60% by weight of another monomer unit copolymerizable therewith, and 0.1 to 5% by weight of a polyfunctional monomer unit, and the polymer of the soft phase, if formed in the absence of other phases, having a Tg of less than 25° C.

The percentage of the outer-most phase based on the polymer with multiphase structure is not particularly limited, but the range of 10 to 80% by weight of the outer phase is preferable to obtain a uniform dispersion of the polymer particles with multiphase structure in a molded product by melt kneading. Tg of the outer-most phase is preferably 50° C. or more for obtaining a molded product with satisfactory heat resistance. Further the outer-most phase preferably has a regulated molecular weight because the coagulated material of the present invention must have a satisfactory heat-melt fluidity in molding or in the case of using a modifier for synthetic resins, especially in the latter case the compatibility of the coagulated material with plastic resins is important. For the regulation of molecular weight, using a chain transfer agent such as mercaptan, etc. is acceptable.

Also, the percentage of soft phase based on the polymer with multiphase structure is not particularly limited, but the range of 10 to 80% by weight of the soft phase, the polymer of the soft phase, if formed in the absence of other phases, having a Tg of less than 25° C. is preferable to obtain a molded product with a satsifactory impact resistance. Equally, Tg of the soft phase is preferably 0° C. or less. The inner phase of the polymer with multi-phase structure can be any structure which comprises a soft phase only or a multiphase structure comprising a soft phase and a hard phase which comprises 40 to 100% by weight of at least one methacrylate unit, 0 to 60% by weight of another monomer unit copolymerizable therewith, and 0 to 5% by weight of a polyfunctional monomer unit, and the hard phase having a Tg of 25° C. or more.

For examples, the polymer with multiphase structure containing the outer-most phase are constituted, from the inner phase, such as two-phase structure of soft phase/hard phase, three-phase structure of hard phase/soft phase/hard phase, four-phase structures of soft phase/hard phase/soft phase/hard phase and hard phase/soft phase/soft phase/hard phase etc.

In the present invention, monomer units comprising the hard phase of the polymer with multiphase structure include methacrylates, such as methyl methacrylate, ethyl methacrylate, butyle methacrylate, benzyl methacrylate, cyclohexyl methacrylate, etc. and mixtures of any of the foregoing, preferably methyl methacrylate; another monomers copolymerizable therewith include of acrylates such as methyl acrylate, ethyl acrylate, butyl acrylate, 2-ethylhexyl acrylate, cyclohexyl acrylate, benzyl acrylate, etc., aromatic vinyl compounds such as styrene, vinyl toluene, α-methyl styrene, etc., N-substituted maleimide compounds such as N-cyclohexyl maleimide, N-o-chlorophenyl maleimide, N-tert-butyl maleimide, etc., vinyl cyanide compounds such as acrylonitrile, methacrylonitrile, etc., and mixtures of any of the foregoing; polyfunctional monomers include allyl methacrylate, allyl acrylate, triallyl cyanurate, allyl cinnamate, allyl sorbite, diallyl maleate, diallyl phthalate, triallyl trimellitate, diallyl fumarate, ethylene glycol diacrylate, ethylene glycol dimethacrylate, polyethylene glycol diacrylate, polyethylene glycol dimethacrylate, divinyl benzene, 1,3-butylene glycol diacrylate, 1,3-butylene glycol dimethacrylate, etc., and mixtures of any of the foregoing.

Also monomer units comprising the soft phase of the polymer with multiphase structure include acrylate such as methyl acrylate, ethyl acrylate, butyl acrylate, 2-ethylhexyl acrylate, cyclohexyl acrylate, benzyl acrylate, etc., and mixtures of any of the foregoing, preferably butyl acrylate, and 2-ethylhexyl acrylate; another monomers copolymerizable therewith include diene compounds such as 1,3-butadiene, 2,3-dimethyl butadiene, isoprene, etc., aromatic vinyl compounds such as styrene, vinyl toluene, α-methyl styrene, etc., methacrylate such as methyl methacrylate, ethyl methacrylate, butyl methacrylate, benzyl methacrylate, cyclohexyl methacrylate, etc., vinyl cyanide compounds such as acrylonitrile, methacrylonitrile, etc., and mixtures of any of the foregoing; polyfunctional monomers include allyl methacrylate, allyl acrylate, triallyl cyanurate, allyl cinnamate, allyl sorbite, diallyl maleate, diallyl phthalate, triallyl trimellitate, diallyl fumarate, ethylene glycol diacrylate, ehylene glycol dimethacrylate, polyethylene glycol diacrylate, polyethylene glycol dimethacrylate, divinyl benzene, 1,3-butylene glycol diacrylate, 1,3-butylene glycol dimethacrylate, etc., and mixtures of any of the foregoing.

The particle sizes of the polymer with multiphase structure prepared by emulsion polymerization are not particularly limited but in the range of 0.01 to 0.5μ, preferably in the range of 0.05 to 0.3μ for having an excellent impact resistance.

The acrylic polymer coagulated material of the invention is characterized by being freeze-coagulated. The polymers isolated by spray-drying, and coagulating with acid or salt can not be used for the present invention because of its inferior handling characteristics and extrusion instability.

In the present invention, the term "latex", "freeze-coagulation", and "coagulated material" are defined as follows.

The term "latex" means fine spherical polymer particles dispersed in water, obtained by emulsion polymerization, having a particle size in diameter of 0.01 to 0.5μ with a protective layer of surfactant, etc. on the particle surface.

The term "freeze-coagulation" means isolation of the polymer particles with multiphase structure formed by emulsion polymerization from latex in a demulsified and coagulated state through the aggregation and compression of the polymer particles by freezing the latex.

The term "coagulated material" means lamellar pseudo-crystal solids with a particle size of ten and a few microns to a few thousand microns through the aggregation and compression of polymer particles with multi-phase structure by freezing latex, and the material is a substance in a state dispersed in freezed water or isolated from latex by melting and dehydrating after freezing.

The coagulated material of the present invention can have various particle sizes as described above, but preferably have an average particle size in the range of 20 to 2000μ, more preferably in the range of 50 to 1000μ. If the average particle size is less than 20μ, the separation characteristics for filteration has become poor, and if that is 2000μ or more, its dispersibility at melt kneading has become poor. The coagulated material with an average particle size of 20 to 2000μ have superior handling characteristics.

The polymer with multiphase structure constituting the coagulated material of the present invention can be produced by conventional emulsion polymerization. For the manufacture of the polymer with multiphase structure, core particles are prepared by emulsion polymerizing a desired monomer mixture. Then another monomer mixture is polymerized in the presence of the core particles to form a shell on the sphere of core. Thereafter, a further different monomer mixture is polymerized on the sphere of the particles with core/shell structure to form another shell on the particle. Repeat the same procedures until the desired polymer with multiphase structure has been formed.

The kind and an amount of the emulsifier to be used for emulsion polymerization are selected from the viewpoints of polymerization system stability, desired particle size, etc. Conventional emulsifiers of anionic, cationic and nonionic surfactants can be used singly or in a mixed state. An anionic surfactant is preferably used as an emulsifier for emulsion polymerization. Suitable anionic surfactants include caboxylates such as sodium stearate, sodium myristate, sodium lauroyl sarcosinate, etc., sulfonates such as sodium dioctylsulfosuccinate, sodium dodecylbenzenesulfonate, etc., ester sulfates such as sodium lauryl sulfate, etc., ester phosphates such as sodium mono-n-butylphenylpentaoxyethylene phosphate, etc.

In the invention, polymerization initiators for emulsion polymerization are not particularly limited, and include inorganic peroxides such as potassium persulfate, ammonium persulfate, etc., water soluble redox type polymerization initiators such as hydrogen peroxide-ferrous salt system, potassium persulfate-sodium acid sulfite system, ammonium persulfate-sodium acid sulfite system, etc., water soluble and oil soluble redox type polymerization initiators such as cumen hydroperoxide-sodium formaldehyde sulfoxylate system, tert-butyl hydroperoxide-sodium formaldehyde sulfoxylate system, etc.

Chain transfer agents used when necessary include n-dodecyl mercaptan, n-octyl mercaptan, tert-dodecyl mercaptan, sec-butyl mercaptan, etc.

Monomers, emulsifiers, polymerization initiators, chain transfer agents used for emulsion polymerization can be added in any way of collective, divisional and continuous additions.

The freeze-coagulation of the present invention will progress according to the following mechanism. When a latex is freezed under the freezing point or less, ice-crystals generated in water phase develop excluding spherical polymer particles and water soluble substances dissolved in water. Spherical polymer particles are confirmed in ice-crystal interstices, and water soluble substances start to precipitate when the water soluble substances reach at their saturation concentrations. The spherical polymer particles have been compressed according to the development of ice-crystals. Under a further reduction in temperature, the water soluble substances has begun to freeze. According to the progress of freezing, bare spherical polymer particles have been strongly compressed into press-bonded state. When the latex passed through these steps is melted, the spherical polymer particles can be isolated from water phase as coagulated material without breaking out of press-bonding.

However, the all coagulated materials and the molded products produced thereof necessarily show excellent properties in handling characteristics, impact resistance, optical properties, hydrothermal resistance, etc. depending on the polymer kinds used and freezing conditions applied. Freeze-coagulating a specific polymer with multiphase structure, more preferably that in a specific freezing condition imparts a preferable press-bonding property to the spherical polymer particles, a preferable particle size to the coagulated material, an excellent washed-out property of impurities such as emulsifiers, etc.

In the manufacturing process of the present invention, conventional freezing methods, such as air-freezing, contact-freezing, dip-freezing, spray-freezing, etc. can be used, in which a freezing rate of 4 cm/hr or less is preferable. Freezing under this condition improves the handling characteristics in after-treatment and stability at extrusion. Freezing rate is defined as a freezed thickness of a polymer latex per unit freezing period which is defined as the period from the starting point wherein the latex temperature is at 0° C. to the ending point wherein that is at −5° C. The polymer obtained by melting at a temperature in the range of 40° to 100° C. is preferably washed out with water at a temperature in the range of 0° to 100° C.

Further, the present invention relates to an acrylic polymer composition (hereinafter, sometimes referred to as "composition".)

One of the acrylic polymer composition of the present invention is a freeze-coagulated material (hereinafter referred to as "coagulated composition") comprising a blend of a latex of a hard polymer formed by emulsion polymerizing a mommer of 50 to 100% by weight of at least one methacrylate unit and 0 to 50% by weight of another monomer unit copolymerizable therewith and a latex of the aforementioned polymer with multiphase structure. With regard to the methacrylate constituting the hard polymer of coagulated composition and the another monomer unit copolymerizable therewith, the similar substances used for the hard phase of the aforementioned polymer with multiphase structure can be used. The hard polymer has been preferably regulated in molecular weight for the improvement of molding, which can be executed with a chain transfer agent such as mercaptan, etc. This coagulated composition has preferably an average particle size of 20 to 2000 $\mu$ by the same reasones as the afore-mention coagulated material. Further, the processes for the emulsion polymerization forming the hard polymer and for the freeze-coagulation of the blended latex can be executed as in the case of the aforementioned coagulated material manufacturing processes. Also the preferable freezing conditions for the polymer compositions are the same as the aforementioned coagulated material.

This coagulated composition prepared by freeze-coagulating the blend of a polymer with multiphase structure obtained by emulsion polymerization and a hard polymer obtained by emulsion polymerization in latex state has an advantage of being more homogeneous than the composition prepared by blending coagulated materials. The molded product made from a coagulated composition prepared by this method have better impact resistances in addition to having better mutual dispersion of polymer particles.

Another acrylic polymer composition of the present invention is a composed product (hereinafter referred to as "resin composition") comprising 1 to 99% by weight of the aforementioned coagulated material and/or the afore-mentioned coagulated composition, and 1 to 99% by weight of a homopolymer or copolymer which comprises 50 to 100% by weight of methyl methacrylate unit and 0 to 50% by weight of another monomer unit copolymerizable therewith. The blend ratio is preferably in the range of 5 to 70% by weight of the former and 30 to 95% by weight of the latter for having balanced characteristics of impact resistance, optical preperties, weatherability, heat resistance, etc.

With regard to the aforementioned latter homopolymers or copolymers, other copolymerizable monomer units include methacrylates such as ethyl methacrylate, cyclohexyl methacrylate, benzyl methacrylate, etc., acrylates such as methyl acrylate, ethyl acrylate, etc., aromatic vinyl compounds such as styrene, vinyl toluene, $\alpha$-methyl styrene, etc., N-substituted maleimide compounds such as N-cyclohexyl maleimide, N-o-chlorophenyl maleimide, N-tert-butyl maleimide, etc., vinyl cyanamid compounds such as acrylonitrile, methacrylonitrile, etc., and mixtures of the aforegoing. They are used singly or in mixed state. Also the aforementioned homopolymer or copolymer has preferably been regulated in molecular weight for the improvement of molderability, for which a chain transer agent such as mercaptan, etc. can be applied. This homopolymer or copolymer can be prepared by conventional polymerization methods, such as suspension polymerization, solution polymerization, emulsion polymerization, bulk polymerization, etc.

Although the conventional methods to improve acrylic resins in impact resistance using a composition blended with a elastic rubbery phase have a drawback to degrade the substantial characteristics of the basic resin, the second composition of the present invention can improve the acrylic resins in impact resistances without degrading the substantial characteristics of the basic resin such as optical properties, hydrothermal resistance, weatherability, etc., which results in the exrtension of application.

Blending methods for the manufacture of the latter compositions of the present invention are not particularly limited, and conventional processes such as mixing by a Henschel Mixer and then melt kneading at a temperature in the range of 200° to 300° C. by an extruder can be used.

According to the present invention, the aforementioned coagulated material and/or coagulated composition can be used to modify synthetic resins such as vinyl chloride resin, styrene resin, etc. In the modified cases, the impact reistances of these resins have been improved without degrading the substantial optical properties, etc. of these basic resins. At that time, a composition comprising 1 to 80% by weight of the aforementioned coagulated material and/or the aforementioned coagulated composition, and 20 to 99% by weight of at least one monomer unit which is styrene, vinyl chloride or acrylonitrile, and 0 to 50% by weight of another monomer copolymerizable therewith is effective. As for another copolymerizable monomer unit of the latter aforementioned homopolymers or copolymers, the similar monomers as used in second compositions can be used, and the homopolymers or copolymers can be obtained by conventional methods such as suspension polymerization, solution polymerization, emulsion polymerization, bulk polymerization, etc.

Tthe present invention further relates to a molded product using the aforementioned coagulated material or the aforementioned composition singly or in admixture therewith.

The molded products of the present invention are molding materials, sheets, films, etc., and further include injection molded articles, thermally processed sheets, films, etc.

The molded products of the present invention comprising the aforementioned coagulated materials and the aforementioned composition singly or in admixture therewith, have a YI (Yellow Index) satisfying the following formula:

$$YI \leq 0.035X + 2.0$$

wherein X is the ratio (weight percent) of the polymer with multiphase structure based on the weight of molded product.

According to the present invention, molded products with excellent characteristics in impact resistances, optical properties, and hydrothermal resistance can be obtained when using the aforementioned coagulated materials, etc. and satisfying the YI formula as described above. If a material other than the aforementioned materials is used, a molded product with excellent characteristics in impact resistance, optical properties, and hydrothermal resistance at the same time cannot be obtained. Further, if the molded products obtained by using the aforementioned materials but not satisfying the YI formula, coloration at molding develops on a pronounced state, which unpreferably results in a limitation in application. YI can be observed according to ASTM-D1925 using a molded product with a thickness of 3 mm. The molded products of the present invention can be produced by conventional methods such as injection molding, extrusion molding, compression molding, vacuum forming, etc. Although the conventional molding materials have required the addition of a dyestuff for color correction, and of a stabilizing agent for the inhibition of yellowing, but that of the present invention have no need of their addition. The improvement in hydrothermal resistance of the present invention extends the end use application range of the molded products into articles used in bath room. To the acrylic polymer coagulated material, acrylic polymer composistions and the molded product manufactured therefrom an addition of lubricant, ultraviolet absorber, light stabilizer, oxidative stablizer, dyestuff and pigment, antistatic agent, flame-retardent, etc. is acceptable when required.

In regard to the acrylic polymer coagulated materials and the compositions thereof, the characteristics in filteration, washing and drying processes have become so refined and also the extrusion stability has become so improved that after-treatments have become very easy, which proved to be very useful in the industry. Also the upgrading of the molded products comprising thereof in optical properties such as low thermal coloration, and in chemical and physical properties such as hydrothermal resistance and impact resistance has enlarged the sphere of use applications.

EXAMPLES

The following Examples are presented to exemplify embodiments of the invention. The observations of properties shown in the following Examples are executed in the following methods.

(1) Fusing or blocking after a coagulated material, a coagulated composition or a solid material is dried:

Dry a coagulated material, a coagulated composition or a solid material in a tray type dryer at 80° C. for 10 hours, then visually evalute the dried state, and show as follows.

×: Fusing or blocking being found
○: No fusing or blocking being found (2) Average particle size in diameter of coagulated material, coagulated composition or solid material:

Observe the particle size in diamter of 200 or more particles of coagulated material, coagulated composition, or solid material under microscope, and account the number average partice size in diameter.

(3) Extrusion stability:

Mix a coagulated material, a coagulated composition or a solid material with a type of acrylic resin beads (beads for PARAPET EH, manufactured by Kuraray Co., Ltd.) in a ratio of 1:1, extrude a sheet with a thickness of 3 mm using a sheet extruder having a cylinder bore diameter of 50 mm, by melt-kneading at a cylinder temperature of 250° C., evaluate the extrusion stability and show the observed results as follows.

Stable: Obtained a good sheet without surging.

Unstable: Difficult to obtain a good sheet because of the tendency of surging (4) Izod impact strength: ASTM-D256

(5) Hydrothermal resistance:

Dip a test piece of flat sheet with a thickness of 3 mm in hot water at 80° C. for 2 hours. Observe the haze on the test piece of flat sheet according to ASTM-D1003 before and after dipping in hot water and get the change of haze before and after dipping in hot water as "Δ haze".

(6) Total light transmittance: ASTM-D1003 (on a sheet with a thickness of 3 mm)

(7) Yellow Index: ASTM-D1925 (on a sheet with a thickness of 3 mm)

(8) Filterability:

Filter 500 ml of suspended solution obtained by freezing and melting of a polymer latex having a 29% by weight of solid constituents using a filter paper with a diameter of 11 cm (No. 2 type, manufactured by Toyo Roshi Co., Ltd.), under a reduced pressure of 20 mm Hg, and observe the period needed for filteration, and evaluate as follows.

Δ: Filtration time is 5 min. or more

○: Filtration time is less than 5 min.

Abbreviations used in Examples are as follows.

Methyl methacrylate (MMA), methyl acrylate (MA), ethyl acrylate (EA), butyl acrylate (BA), styrene (ST), allyl methacrylate (ALMA), N-cyclohexyl maleimide (CHMI), 1,3-butylene glycol dimethacrylate (BGDMA), cummene hydroperoxide (CHP), n-octyle mercaptan (n-OM), sodium formaldehyde sulfoxylate (Rongalite), sodium stearate (SS), sodium dioctylsulfosuccinate (SDOSS), sodium lauroyl sarconsinate (LSS).

Parts and percentages are shown by weight unless otherwise specifically noted.

EXAMPLE 1

A reaction vessel equipped with a reflux condenser was charged with 250 parts of ion-exchanged water, 1.0 part of SS, 29.4 parts of MMA, 0.6 parts of MA, 0.15 parts of ALMA. Then 0.3 parts of a 10% aqueous potassium persulfate solution was added to the reaction mixture. The temperature of the reaction mixture was raised up to 80° C. and kept at the temperature for a period of 60 min.

In the presence of the resulting latex, 0.5 parts of a 10% aqueous potassium persulfate solution was added, then a monomer mixture of 40.7 parts of BA, 9.3 parts of ST, and 0.25 parts of ALMA was continuously added for a period of 60 min., and further kept for a period of 30 min.

Thereafter, in the presence of the resulting latex, 0.2 parts of a 10% aqueous potassium persulfate solution was added, then a monomer mixture of 19.6 parts of MMA, 0.4 parts of MA, and 0.06 parts of n-OM was continuously added for a period of 30 min., and the reaction mixture was further kept for a period of 60 min. Thus obtained a latex comprising a polymer with three-phase structure.

The obtained latex was placed in a container made of stainless steel up a height of 6 cm, and freezed at −20° C. in a freezer. The period between the time when the temperature of the fastest freezing part reached at 0° C. and that when the temperature of the slowest freezing part reached at −5° C. observed with the aid of a thermo-couple instrument in the latex was found to be 6 hours. That is, the freezing rate was 1 cm/hr. The latex was kept in freezed state for an additional period of 2 hours after the time when the temperature of the slowest freezing part passed at −5° C., thereafter the freezed latex was unloaded from the container.

After the freezed latex was melted at 70° C., the coagulated material was isolated by filteration, followed by 3 times of washing with water at 70° C., and then dried at 80° C. for 10 hours. The coagulated material was a free-flowing material without fusing or blocking having an average particle size in diameter of 200μ.

The obtained dried coagulated material was mixed with a type of acrylic resin beads (beads for PARAPET EH, manufactured by Kuraray Co., Ltd.) in a ratio of 1:1, and the mixture was kneaded using an extruder with a cylinder bore diameter of 50 mm at a cylinder temperature of 250° C. and extruded into a sheet with a thickness of 3 mm. At that time, the mixture showed superior extrusion stability without surging.

The observed results are shown in Table 1.

TABLE 1

| | Isolation method Coagulation agent for solidification | Fusing or blocking at drying | Extrusion stability |
|---|---|---|---|
| Example 1 | Freeze-coagulation | ○ | Stable |
| Comparative Example 1 | 1% Aluminum chloride aqueous solution | X | Unstable |
| Comparative Example 2 | 3% Sodium chloride aqueous solution | X | Unstable |
| Comparative Example 3 | 2% Magnesium sulfate aqueous solution | X | Unstable |
| Comparative Example 4 | 1% Sulfuric acid aqueous solution | X | Unstable |
| Comparative Example 5 | Spray-drying | — | Unstable |
| Example 6 | Freeze-coagulation | ○ | Stable |
| Comparative Example 6 | 1% Aluminum chloride aqueous solution | X | Unstable |
| Comparative Example 7 | 1% Sulfuric acid aqueous solution | X | Unstable |
| Comparative Example 8 | Spray-drying | — | Unstable |

COMPARATIVE EXAMPLE 1

The polymer in the final latex obtained by Example 1 was salted out at 70° C. with a 1% aqueous aluminum chloride solution in an amount of two times of the latex, followed by 3 times of washing with water at 70° C. and dehydrateing, and dried at 80° C. for a period of 10 hours. The obtained dried solid material was found to have fusing and blocking. Accordingly, the solid material was separately dried at 60° C. for a period of 15 hours, and the obtained dried solid material was found to have an average particle size of 20 μ. The obtained dried solid material was mixed with an type of acrylic resin beads (beads for PARAPET EH, manufactured by Kuraray Co., Ltd.) in a ratio of 1:1, and the mixture was kneaded using an extruder with a cylinder bore diameter of 50 mm at a cylinder temperature of 250° C. and extruded into a sheet with a thickness of 3 mm. At that time, the extruded sheet tended to surge and it was difficult to obtain a good sheet. These observed results on the extruded sheet are shown in Table 1.

COMPARATIVE EXAMPLES 2–4

Comparative Example 1 was repeated except that a 1% aqueous aluminum chloride solution was replaced by a 3% aqueous sodium chloride solution, a 2% aqueous magnesium sulfate solution or a 1% aqueous sulfuric acid respectively in Comparative Examples 2, 3 and 4. The obtained dried solid materials were evaluated as Comparative Example 1. The observed results are shown in Table 1.

COMPARATIVE EXAMPLE 5

The polymer in the final latex obtained by Example 1 was spray-dried in a spray-dryer having a inlet hot air temperature of 170° C. The isolated dried solid material was in very fine powder state. The obtained dried solid material was mixed with a type of acrylic resin beads (beads for PARAPET EH, manufactured by Kuraray Co., Ltd.) in a ratio of 1:1, and the mixture was kneaded at a cylinder temperature of 250° C. and extruded into a sheet with a thickness of 3 mm using an extruder with a cylinder bore diameter of 50 mm. At that time, the melt-extruded sheet tended to surge, and it was difficult to obtain a good sheet. These observed results are shown in Table 1.

As shown in Table 1, the freeze-coagulated material shows excellent handling characteristics and superior extrusion stability.

EXAMPLES 2-5

The final latex obtained by Example 1 was respectively freezed under the conditions as described in Table 2. After the respective freezed latex has been melted at 70° C., the coagulated material was isolated by filteration, and at the same time filterability was tested. The respective filtrate was observed in light transmittance at 600 nm using a glass-cell with a thickness of 1 cm. The results observed as Example 1 except the aforementioned subject are shown in Table 2.

TABLE 2

| Example No. | Freeze-coagulation Condition | | Particle Size of Coagulated Material (μ) | Filterability | Light Transmittance of Filtrate (%) | Fusing or Blocking of Coagulated Material at Drying | Extrusion Stability |
|---|---|---|---|---|---|---|---|
| | Freezing Temperature (°C.) | Freezing Rate (cm/hr) | | | | | |
| 2 | −10 | 0.7 | 215 | ○ | 80 | ○ | Stable |
| 3 | −30 | 1.3 | 180 | ○ | 65 | ○ | Stable |
| 4 | −50 | 2.0 | 150 | ○ | 55 | ○ | Stable |
| 5 | −190 | 5.0 | 15 | Δ | 40 | ○ | Stable |

EXAMPLE 6

A reaction vessel equipped with a reflux condenser, was charge with 250 parts of ion-exchanged water, 1.0 part of LSS, 47 parts of MMA, 3 parts of MA, 0.15 parts of n-OM. Then, 0.5 parts of a 10% aqueous potassium persulfate solution was added to the reaction mixture. The temperature of the reaction mixture was raised up to 80° C. and kept at the temperature for a period of 90 min.

Thereafter, in the presence of the resulting latex, 0.5 parts of a 10% potassium persulfate solution was added, then a monomer mixture of 47 parts of MMA, 3 parts of MA and 0.15 parts of n-OM was continuously added for a period of 30 min., and the reaction mixture was kept at the temperature for 60 min. to give a latex.

The obtained latex was mixed with the one obtained by Example 1 in a ratio of 1:1. Thereafter the same procedures as Example 1 were executed. The observed results are shown in Table 1.

COMPARATIVE EXAMPLES 6-8

The procedures of Comparative Examples 1, 4, and 5 were respectively repeated except that the final latex of Example1 was replaced by the blended latex of Example 6. The observed results are shown in Table 1.

As shown in Table 1, the freeze-coagulated compositions show excellent handling characerstics and superior extrusion stabilities.

EXAMPLE 7

The dried coagulated material obtained by Example 1 was mixed with a type of methacrylic resin (beads for PARAPET HR-L, manufactured by Kuraray Co., Ltd.) in a ratio of 1:1. The blended mixture was melt-kneaded at a cylinder temperature of 250° C. using an extruder with a cylinder bore diameter of 40 mm, and extruded into pellets. The obtained pellets were injection-molded at a cylinder temperature of 250° C. and a mold temperature of 50° C. to give test-pieces for izod impact strength according to ASTM and a flat sheet having a size of 50×50×3 mm. The observed results on these test-pieces are shown in Table 3.

COMPARATIVE EXAMPLES 9-13

The procedures of Example 7 were repeated except that the dried coagulated material obtained by Example 1 was respectively replaced by the dried solid material obtained by Comparative Examples 1-5. The observed results as Example 7 are shown in Table 3.

TABLE 3

| | Isolation Method or Coagulation Agent for Solidification | Izod Impact Strength (Kg-cm/cm) | Total Light Transmittance (%) | Yellow Index | Hydrothermal Resistance (Δ haze) |
|---|---|---|---|---|---|
| Ex. 7 | Freeze-coagulation | 7.0 | 92.0 | 2.0 | 4.5 |
| Com. Ex. 9 | 1% Aluminum chloride aqueous solution | 6.5 | 91.4 | 7.0 | 35.0 |
| Com. Ex. 10 | 3% Sodium chloride aqueous solution | 6.6 | 91.5 | 5.0 | 37.0 |
| Com. Ex. 11 | 2% Magnesium sulfate aqueous solution | 6.6 | 91.8 | 2.5 | 40.0 |
| Com. Ex. 12 | 1% Sulfuric acid aqueous solution | 6.5 | 91.5 | 4.5 | 10.0 |
| Com. Ex. 13 | Spray-drying | 6.7 | 91.6 | 6.0 | 6.0 |
| Ex. 9 | Freeze-coagulation | 7.5 | 92.1 | 3.0 | 4.0 |
| Com. Ex. 18 | 1% Aluminum chloride aqueous solution | 6.8 | 91.5 | 10.0 | 36.0 |
| Com. Ex. 19 | 1% Sulfuric acid aqueous solution | 6.8 | 91.6 | 6.5 | 10.5 |
| Com. Ex. 20 | Spray-drying | 6.9 | 91.6 | 8.0 | 6.0 |
| Ex. 12 | Freeze-coagulation | 6.6 | 91.6 | 2.7 | 4.0 |
| Ex. 13 | Freeze-coagulation | 9.0 | 91.0 | 3.2 | 5.0 |
| Com. Ex. 23 | 1% Aluminum chloride aqueous solution | 6.2 | 90.9 | 8.0 | 40.0 |
| Com. Ex. 24 | 1% Aluminum chloride aqueous solution | 8.5 | 90.5 | 10.0 | 45.0 |

Note:
Ex. = Example
Com. Ex. = Comparative Example

As shown in Table 3, the molded products obtained from the coagulated composition and the resin composition show excellent optical properties, hydrothermal resistances and impact resistances as compared others.

EXAMPLE 8

The dried coagulated material obtained by Example 1 was compression-molded at 190° C., under a pressure of 10 kg/cm$^2$, for a period of 10 min. to give a flat sheet with a thickness of 3 mm. The test sheet was tested a Yellow Index and total light transmittance. The observed results were a Yellow Index of 3.5 and a total light transmittance of 90.0%, which are shown in Table 4.

TABLE 4

| | Isolation method or Coagulation agent for solidification | Molded product Characteristics | |
|---|---|---|---|
| | | Yellow Index | Total light transmittance (%) |
| Example 8 | Freeze-coagulation | 3.5 | 90.0 |
| Comparative Example 14 | 1% Aluminum chloride aqueous solution | 12.0 | 89.5 |
| Comparative Example 15 | 3% Sodium chloride aqueous solution | 9.0 | 89.6 |
| Comparative Example 16 | 1% Sulfuric acid aqueous solution | 7.5 | 89.4 |
| Comparative Example 17 | Spray-drying | 10.0 | 89.1 |
| Example 14 | Freeze-coagulation | 3.6 | 89.8 |
| Example 15 | Freeze-coagulation | 4.8 | 89.9 |
| Comparative Example 25 | 1% Aluminum chloride aqueous solution | 12.5 | 88.0 |
| Comparative Example 26 | 1% Aluminum chloride aqueous solution | 15.0 | 88.2 |

COMPARATIVE EXAMPLES 14-17

The procedures of Example 8 were repeated except that the dried coagulated material obtained by Example 1 was respectively replaced by the dried solid material obtained by Comparative Examples 1, 2, 4 and 5. The observed results are shown in Table 4 as Example 8.

As shown in Table 4, the molded products using the freeze-coagulated materials show excellent optical properties as compared with others.

EXAMPLE 9

The dried coagulated composition obtained by Example 6 was kneaded at a cylinder temperature of 250° C. and extruded into pellets using an extruder with a cylinder bore diameter of 40 mm. The obtained pellets were injection-molded at a cylinder temperature of 250° C. and a mold temperature of 50° C. to give test-pieces for izod impact strength according to ASTM and a flat sheet with a size of 50×50×3 mm. The observed results in various characteristics on these test-pieces are shown in Table 3.

COMPARATIVE EXAMPLES 18-20

The same procedures as Example 9 were repeated except that the dried coagulated composition obtained by Example 6 was respectively replaced by the dried solid materials obtained by Comparative Examples 6, 7 and 8. The observed results are shown in Table 3.

As shown in Table 3, the molded products using freeze-coagulated compositions have excellent optical properties, hydrothermal resistances and impact resistances.

EXAMPLES 10 AND 11, AND COMPARATIVE EXAMPLES 21 AND 22

The coagulated materials and the solid materials respectively obtained by the procedures as Example 1 and Comparative Example 1 except that using the compositions of the polymer with multiphase structure and the emulsifier in kind and in an amount shown in Table 5 were evaluated according to the procedures respectively as Example 1 and Comparative Example 1. The observed results are shown in Table 6.

TABLE 5

| | Emulsifier (part) | Polymer Composition of Multiphase Structure |
|---|---|---|
| Example 10 | SS | MMA-MA-ALMA/BA-ST-ALMA/MMA-MA-BGMDA/MMA-MA-n-OM |
| Comparative Example 21 | 1.0 | 29.7-0.3-0.15/24.5-5.5-0.2/19.8-0.2-0.1/19.8-0.2-0.05 |
| Example 11 | SDOSS | BA-ST-ALMA/MMA-MMA-EA-n-OM |
| Comparative Example 22 | 1.0 | 49.0-11.0-0.3/39.0-1.0-0.1 |

TABLE 6

| | Isolation method or Coagulating agent for solidification | Average Particle size (μ) | Fusing or blocking at drying | Extrusion Stability |
|---|---|---|---|---|
| Ex. 10 | Freeze-coagulation | 150 | ○ | Stable |
| Ex. 11 | Freeze-coagulation | 220 | ○ | Stable |
| Com. Ex. 21 | 1% Aluminum chloride aqueous solution | 20 | X | Unstable |
| Com. Ex. 22 | 1% Aluminum chloride aqueous solution | 25 | X | Unstable |

Note:
Ex. = Example
Com. Ex. = Comparative Example

In Table 5, hyphen (—) is used to show the monomer unit construction in a phase and slash (/) is used to separate the phases showing from the inner-most phase to the outer-most phase in the order from left to right.

EXAMPLE 12 AND COMPARATIVE EXAMPLE 23

The same procedures as Example 7 were repeated except that the dried coagulated material obtained by Example 1 was respectively replaced by the dried coagulated material obtained by Example 10 and the solid material obtained by Comparative Example 21 and respectively mixed with a type of methacrylic resin (beads for PARAPET HR-L, manufactured by Kuraray Co., Ltd.) in a ratio of 7:3. The obtained results are shown in Table 3.

EXAMPLE 13 AND COMPARATIVE EXAMPLE 24

The same procedures as Example 7 were repeated except that the dried coagulated material obtained by Example 1 was respectively replaced by the coagulated material obtained by Example 11 and the solid material obtained by Comparative Example 22 and respectively mixed with a type of methacrylic resin (beads for PARAPET HR-L, manufactured by Kuraray Co., Ltd.) in a ratio of 1:1. The obtained results are shown in Table 3.

EXAMPLES 14 AND 15, AND COMPARATIVE EXAMPLES 25 AND 26

The same procedures as Example 8 were repeated except that the dried coagulated material obtained by Example 1 was respectively replaced by the coagulated material obtained by Examples 10 and 11, and the solid material obtained by Comparative Examples 21 and 22. The obtained results are shown in Table 4.

EXAMPLE 16

A reaction vessel equipped with a reflux condenser was charged with 250 parts of ion-exchanged water and 1.0 part of SDOSS. Then 0.1 parts of Rongalite was added to the reaction mixture with stirring, in oxygen-free state by purged with nitrogen gas, and the temperature of the reaction mixture had been raised up to 70° C. Then, a monomer mixture comprising 46.4 parts of BA, 16.2 parts of ST, 0.6 parts of ALMA, and 0.13 parts of CHP was continuously added for a period of 200 min., and further kept for a period of 90 min.

Thereafter, in the presence of the resulting latex, a monomer mixture comprising 31.5 parts of MMA, 1.5 parts of ST, 4.5 parts of CHMI, 0.07 parts of n-OM, and 0.04 parts of CHP was continuously added for a period of 30 min., and the reaction mixture was further kept for an additional period of 60 min. Thus obtained a latex comprising a polymer with double-phase structure.

The obtained latex was freezed at −20° C. for a period of 8 hours. After the freezed latex was melted at 70° C., the polymer was isolated by filteration, followed by 3 times of washing with water at 70° C., and dried at 90° C. for 10 hours to give a free-flowing coagulated material without fusing or blocking having an average particle size in diameter of 220μ.

The obtained coagulated material was mixed with an acrylic resin comprising 80% of MMA, 5% of ST, and 15% of CHMI in a ratio of 1:1. Then, the mixture was melt-kneaded and extruded into pellets at a cylinder temperature of 250° C. using an extruder with a cylinder bore diameter of 40 mm. The obtained pellets were injection-molded at a cylinder temperature of 250° C. and a mold temperature of 50° C. to give a flat-sheet with a size of 50×50×3 mm. The observed results using this test flat-sheet were a total light transmittance of 91.8% and a Yellow Index of 3.5 in optical properties, and a Δhaze value of 5.0 in hydrothermal resistant characteristics.

COMPARATIVE EXAMPLE 27

The final latex obtained by Example 16 was salted out at 70° C. with a 3% sodium chloride solution in an amount of 2 times of the latex, followed by drying at 90° C. for 10 hours. In the obtained dried solid material, a fused or blocked state was found. Accordingly, the drying condition was changed to a drying temperature of 60° C. for 15 hours. The evaluation was carried out by the same procedures as Example 16 except the aforementioned conditions. The obtained results were a total light transmittance of 91.5%, a Yellow Index of 9.0, and a Δhaze value of 45 in hydrothermal resistance, which are infereior as compared with the values of Example 16.

We claim:

1. A process for producing an acrylic polymer coagulated material comprising preparing a latex of a polymer with multiphase structure formed by emulsion polymerization which comprises 1) the outer-most phase being a hard phase comprising 40 to 100% by weight of at least one methacrylate unit and 0 to 60% by weight of another monomer unit copolymerizable therewith, and the polymer of the hard phase, if formed in the absence of other phases, having a glass transition temperature of 25° C. or more; and (2) at least one inner phase being a soft phase comprising 40 to 99.9% by weight of at least one acrylate ester unit, 0 to 60% by weight of another monomer copolymerizable therewith, and 0.1% to 5% by weight of polyfunctional monomer unit, and the polymer of the soft phase, if formed in the absence of other phases, having a glass transition temperature of less than 25° C.: and isolating the polymer with multiphase structure from the latex by freezing at a rate of 0.7 to 4 cm/hr, melting at a temperature of 40°–180° C. and dehydrating, the average particle size of coagulated acrylic polymer being 50–1,000 μm.

* * * * *